United States Patent [19]
James

[11] Patent Number: 5,097,622
[45] Date of Patent: Mar. 24, 1992

[54] BARBLESS FISH HOOK ASSEMBLY

[76] Inventor: A. J. James, 1242 N. Lake Shore Dr., Chicago, Ill. 60610

[21] Appl. No.: 439,647

[22] Filed: Nov. 28, 1989

Related U.S. Application Data

[63] Continuation of Ser. No. 253,857, Oct. 3, 1988, abandoned.

[51] Int. Cl.⁵ .............................................. A01K 97/02
[52] U.S. Cl. .................................................. 43/43.16
[58] Field of Search ..................... 43/43.16, 44.8, 43.1

[56] References Cited

U.S. PATENT DOCUMENTS

| | | | |
|---|---|---|---|
| 2,990,641 | 7/1961 | Weidman | 43/43.16 |
| 3,026,647 | 3/1962 | Rainey | 43/44.8 |
| 3,758,976 | 9/1973 | Szwolkon | 43/43.16 |
| 4,715,142 | 12/1987 | Richard | 43/43.16 |
| 4,768,304 | 9/1988 | Preiser | 43/43.16 |

Primary Examiner—Kurt Rowan
Attorney, Agent, or Firm—Louis E. Marn

[57] ABSTRACT

There is disclosed a novel fish hook assembly comprised of a hook body having an eye, a shank and a curved bend terminating in a tip and a sleeve of material disposed on the curved bend of the hook body proximate the tip, preferably in an area of reduced cross-section.

10 Claims, 1 Drawing Sheet

BARBLESS FISH HOOK ASSEMBLY

This is a continuation of application Ser. No. 07/253,875, filed Oct. 3, 1988, now abandoned.

BACKGROUND OF THE INVENTION (1) Field of the Invention

This invention relates to fish hooks, and more particularly to a novel, barbless fish hook assembly.

(2) Description of the Prior Art

Fish hooks are one of the oldest known implements beginning with a device known as a gorge, formed by a straight shaft having pointed opposite ends with a line tied around the middle of the shaft. The gorge was effective only if the fish swallowed the bait with the gorge buried therein, thereby limiting its use since many varieties of fish only nibble or mouth the bait.

Consequently, some six or seven thousand years ago the evolution of the modern fish hook began. The gorge evolved into the form of a double barbless hook to which barbs were latter added. As it was discovered that a single barbed hook was more effective, the modern type hook came into existance. During the 1400s hooks began to be constructed of steel. There have not been any significant changes to the basic barbed hook during the past 500 years.

The barb (a projection extending backward from the point of the hook helps keep the hook embedded in the flesh of the fish by resisting backwards motion) has several deficiencies. The barb substantially increases the force required to effect penetration versus a comparably sized barbless hook even if maintained in a perfectly sharpened condition. Moreover, a perfectly sharpened barb can cut a gap during penetration thereby reducing its holding effectiveness. The barb can also cause mutilation when the hook accidentally becomes inbedded in the hand or another part of the human body.

In U.S. Pat. No. 4,723,372 there is disclosed an improved barbless fish hook in which the shank, eye, and bend are of conventional configuration and can take on virtually any size, style or shape with a flattened point having opposed planar faces, one of which faces toward the shank of the fish hook permitting penetration while more easily dislodged. Such fish hook, however, neither optimizes penetration facilitation, nor dislodging resistance.

OBJECTS OF THE INVENTION

An object of the present invention is to provide a novel barbless fish hook assembly.

Another object of the present invention is to provide a novel barbless fish hook assembly permitting of facile penetration and setting.

Still another object of the present invention is to provide a novel barbless fish hook assembly resulting in minimal tearing of the flesh of the fish thereby improving survivability of fish which escape or are released.

Yet another object of the present invention is to provide a novel barbless fish hook assembly of holding capabilities equivalent to, or superior to, the conventional barb without inherent deficiencies of the barb.

Still yet another object of the present invention is to provide a novel barbless fish hook assembly which reduces mutilation to the human body should the hook become accidentally imbedded therein.

A still further object of the present invention is to provide a novel barbless fish hook assembly obviating the necessity of sharpening of the tip and the barb of the fish hook assembly.

SUMMARY OF THE INVENTION

These and other objects of the present invention are achieved by a fish hook assembly comprised of a body having an eye, a shank and a curved bend terminating in a tip and a sleeve of material disposed on the curved bend of the hook body proximate the tip, preferably in an area of reduced cross-section.

BRIEF DESCRIPTION OF THE DRAWINGS

Further objects of the present invention will become more readily apparent from the following detailed description when taken with the accompanying drawings wherein like numerals indicate like parts throughout, and wherein.

DETAILED DESCRIPTION OF THE INVENTION

Figure 1:
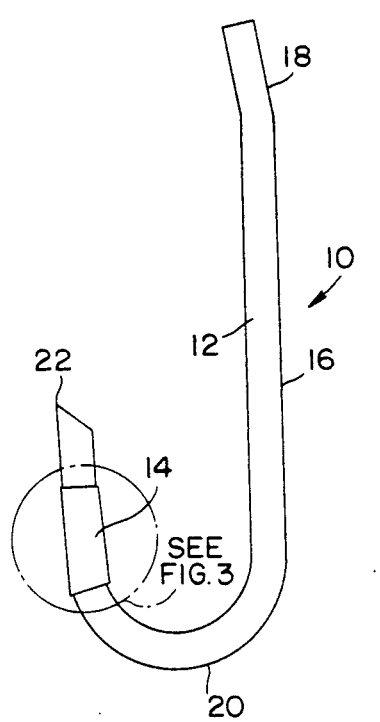
FIG. 1 is a side elevational view of an embodiment of the present invention.
Figure 2:
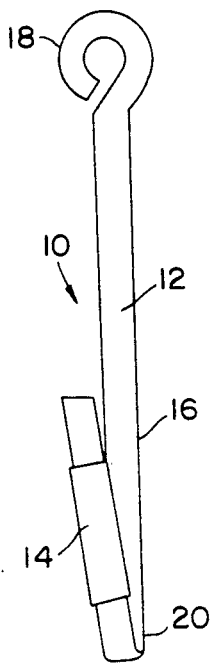
FIG. 2 is a front elevational view of the embodiment of FIG. 1.
Figure 3:
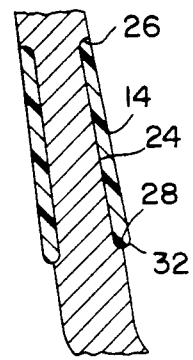
FIG. 3 is an enlarged partial cross-sectional elevational view of a portion of the embodiment of FIG. 1.
Figure 4:
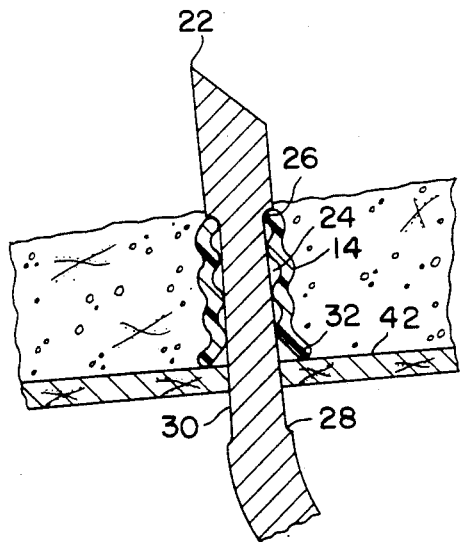
FIG. 4 is an enlarged partial cross-sectional elevational view of the present invention after penetration and setting of the fish hook assembly of the present invention.

Referring now to the drawings and particularly FIGS. 1 and 2, there is illustrated a fish hook assembly, generally indicated as 10, depicting one embodiment of the present invention. The fish hook assembly 10 is comprised of a body 12 having a sleeve 14 positioned thereon. The body 12 is formed, preferably, of a metallic material, and shaped to include a straight shank 16 having a ring or eye 18 formed so that the fish hook assembly 10 can be attached to a fishing line (not shown). The body 12 is formed with a smoothly curved bend 20 terminating at its other end with a pointed tip 22. The curved bend 20, referring also to FIGS. 3 and 4, is formed with a portion 24 of reduced cross-sectionl area including a leading inner curved surface portion 26 and a trailing inner curved surface portion 28 defining an outwardly extending tapered surface 30 extending from curved surface portion 26 proximate the pointed tip 22.

The sleeve 14 is positioned within the portion 24 of reduced cross-section and extends outwardly from the leading inner curved surface portion 26 as a result of the tapered surface 30 terminating in an end portion 32 of the sleeve 14 extending outwardly beyond the body 12 to provide frictional engagement, as more fully hereinafter discussed. The sleeve 14 to be positioned on the body 12 about the portion 24 may be of any flexible and resilient material compatible with intended use (water exposure, etc.) including natural and synthetic materials. Generally, the sleeve 14 is formed of an oriented thermoplastic material, slid over the tip 22 and onto the portion 24 and shrunk about the portion 24 by suitable heating techniques, e.g. bare flame, etc. Generally, the sleeve 14 is positioned on the hook body 12 as close as possible to the pointed tip 22 and is of a preselect length as a function of usage.

The portion 24 of reduced cross-sectional area may be readily formed by stretch deformation of a wire fish hook substrate prior to cutting and forming into a fish hook configuration. The pointed tip 22 is formed by honing, grinding, millimg or the like, an end surface of the wire at a predetermined angle to the axis thereof.

Figure 5:
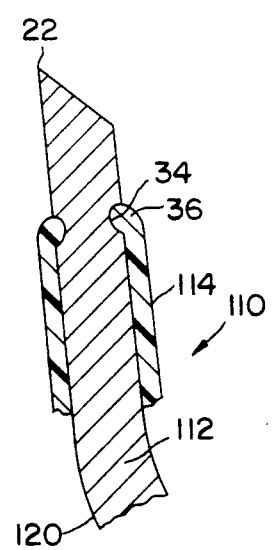
FIG. 5 is an enlarged partial cross-sectional elevational view of another embodiment of the present invention.

Referring to FIG. 5, there is illustrated another embodiment of the present invention wherein the fish hook assembly 110 is comprised of a body 112 having a circumferentially-formed groove 34. The sleeve 114 is positioned on the body 112 with an end 36 thereof disposed in the groove 34 with the remaining portion of the sleeve depending downwardly therefrom about the curved bend portion 20.

Figure 6:
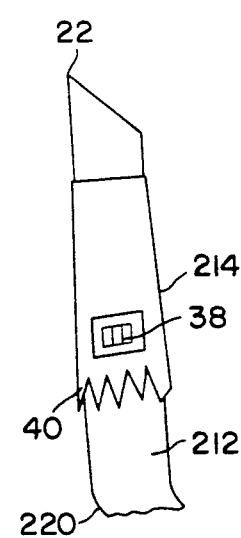
FIG. 6 is an enlarged partial elevational view of still another embodiment of the present invention.

Referring to FIG. 6, there is illustrated another embodiment of the present invention wherein the fish hook assembly 210 includes a sleeve 214 formed with embossed portions 38 (one shown) or a trailing edge formed with toothed members 40, for positioning on the body 212. In some instances, it may be desirable to use a sleeve 214 having both embossed portions 38 and toothed members 40.

In operation and in use, referring to FIGS. 1 to 4, the sharply pointed tip 22 readily penetrates the interior layer 42 in the mouth of a fish when it strikes, and generally remains hooked after penetration through the interior layer 42 in the mouth of the fish, since the pull on the fish line (not shown) is away from the tip 20. Upon slackening, such as by the fish moving towards the fisherman there is a tendency to cause the fish hook assembly 10 to be withdrawn from the point of penetration in the interior layer 42 of the mouth of the fish, the sleeve 14 of material is caused, by frictional engagement, to roll-up or bunch-up against itself against the interior layer in the mouth or internal flesh of the fish, referring specifically to FIG. 4 and provides greater holding power than that associated with the barb of the usual fish hook configuration.

While the present invention has been described with reference to a preferred embodiment wherein the hook body 12 is formed with a section 24 of reduced cross-section in tapered configuration to receive the sleeve of material 14, the sleeve 14 may be attached, such as by an adhesive or by frictional forces to the body 12 wherein the body 12 is not formed with an area of reduced cross-section. The fish hook assembly 10 of the present invention may be formed of any size consistent with intended use, from fish hook sizes associated with fly rod fishing to those associated with shark, tuna, etc. fishing.

While the invention has been described in connection with an exemplary embodiment thereof, it will be understood that many modifications will be apparent to those of ordinary skill in the art and that this application is intended to cover any adaptations or variations thereof. Therefore, it is manifestly intended that this invention be only limited by the claims and the equivalents thereof.

What is claimed is:

1. A novel fish hook assembly, which comprises:
   a hook body terminating in a tip and including a shank having a curved section; and
   sleeve means of flexible material positioned on and attached to said hook body proximate said tip and extending towards said curved section of said shank for setting of a fish on said hook body.

2. The novel fish hook assembly as defined in claim 1 wherein said sleeve means is attached in an area of reduced cross-section thereof.

3. The novel fish hook assembly as defined in claim 2 wherein said area of reduced cross section is tapered outwardly from said tip of said hook body.

4. The novel fish hook assembly as defined in claim 2 wherein said area of reduced cross-sectional area is defined by a circumferentially-formed groove.

5. The novel fish hook assembly as defined in claim 1 wherein said sleeve means is formed of a thermoplastic resin heat shrunk onto said hook body.

6. The novel fish hook assembly as defined in claim 3 wherein said sleeve means is disposed within said area of reduced cross-section and is of a diameter greater than a diameter of said hook body proximate said area of reduced cross-section.

7. The novel fish hook assembly as defined in claim 1 wherein said sleeve means is resilient to frictional forces.

8. The novel fish hook assembly as defined in claim 1 wherein said sleeve means is provided with embossed outer surface portions.

9. The novel fish hook assembly as defined in claim 1 wherein said sleeve means is provided with toothed members on a trailing edge thereof.

10. The novel fish hook assembly as defined in claim 8 wherein said sleeve means is provided with toothed members on a trailing edge thereof.

* * * * *